United States Patent
Li et al.

(10) Patent No.: US 10,884,774 B2
(45) Date of Patent: Jan. 5, 2021

(54) VIRTUAL NODE DEPLOYMENTS OF CLUSTER-BASED APPLICATIONS MODIFIED TO EXCHANGE REFERENCE TO FILE SYSTEMS

(71) Applicant: Hewlett Packard Enterprise Development LP, Houston, TX (US)

(72) Inventors: Jun Li, Mountain View, CA (US); Hernan Laffitte, Mountain View, CA (US); Donald E. Bollinger, Monte Sereno, CA (US); Eric Wu, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 346 days.

(21) Appl. No.: 15/311,914

(22) PCT Filed: Jun. 16, 2014

(86) PCT No.: PCT/US2014/042563
§ 371 (c)(1),
(2) Date: Nov. 17, 2016

(87) PCT Pub. No.: WO2015/195079
PCT Pub. Date: Dec. 23, 2015

(65) Prior Publication Data
US 2017/0090973 A1   Mar. 30, 2017

(51) Int. Cl.
*G06F 9/455* (2018.01)
*G06F 16/188* (2019.01)

(52) U.S. Cl.
CPC ........ *G06F 9/45558* (2013.01); *G06F 16/188* (2019.01); *G06F 2009/45562* (2013.01); *G06F 2009/45583* (2013.01)

(58) Field of Classification Search
CPC ........... G06F 9/45558; G06F 17/30233; G06F 2009/45583; G06F 2009/45562; G06F 16/188
See application file for complete search history.

(56) References Cited

U.S. PATENT DOCUMENTS

| 8,412,810 B1 | 4/2013 | Tompkins |
| 8,667,489 B2 * | 3/2014 | Sobel ...................... G06F 21/53 718/1 |

(Continued)

OTHER PUBLICATIONS

Marinescu, Dan. "Cloud Computing Theory and Practice", Chapter 5, Section 5.4 "Virtual machines", paragraph 1, available 2013 (Year: 2013).*

(Continued)

*Primary Examiner* — Meng Ai T An
*Assistant Examiner* — Michael W Ayers
(74) *Attorney, Agent, or Firm* — Hewlett Packard Enterprise Patent Department

(57) ABSTRACT

Examples relate to deploying distributed applications using virtual nodes. In some examples, virtual nodes are created and are each assigned a core subset of a number of processing cores, an Internet protocol (IP) address, and an in-memory file system configured to provide access to a portion of physically shared memory. At this stage, a distributed application that is configured to be deployed to a plurality of machine nodes is deployed to the plurality of virtual nodes. On a first virtual node, a reference to a first dataset stored in physically shared memory is sent to a second virtual node, where the physically shared memory is accessible to each of the plurality of virtual nodes. Next, on the second virtual node, the first dataset is accessed through the in-memory file system of the first virtual node.

12 Claims, 3 Drawing Sheets

(56) References Cited

U.S. PATENT DOCUMENTS

| | | | |
|---|---|---|---|
| 8,700,727 B1* | 4/2014 | Gole | H04L 67/104 709/213 |
| 9,703,582 B1* | 7/2017 | Chigurapati | G06F 9/45533 |
| 2004/0044872 A1 | 3/2004 | Scott | |
| 2005/0039180 A1 | 2/2005 | Fultheim et al. | |
| 2005/0044339 A1 | 2/2005 | Sheets | |
| 2005/0223005 A1* | 10/2005 | Shultz | G06F 9/526 |
| 2005/0273571 A1 | 12/2005 | Lyon et al. | |
| 2008/0270674 A1* | 10/2008 | Ginzton | G06F 9/45533 711/6 |
| 2011/0225467 A1* | 9/2011 | Betzler | G06F 11/1438 714/55 |
| 2012/0023492 A1* | 1/2012 | Govindan | G06F 9/52 718/1 |
| 2013/0073730 A1* | 3/2013 | Hansson | G06F 9/5044 709/226 |
| 2013/0111468 A1* | 5/2013 | Davis | G06F 9/5077 718/1 |

OTHER PUBLICATIONS

D.L. Doubleday, "Building Distributed Ada Applications From Specifications and Functional Components,:" Dec. 1991; 26 pages; <http://resources.sei.cmu.edu/asset_files/TechnicalReport/1991_005_001_15965.pdf.

International Search Report and Written Opinion of the International Searching Authority, dated Mar. 16, 2015, issued in related PCT Application No. PCT/US2014/042563.

Mike Matchett, "Virtualizing Hadoop impacts Big Data Storage," Jul. 16, 2013, 3 pages; <http://www.enterprisestorageforum.com/storage-management/virtualizing-hadoop-impacts-big-data-storage.html.

R. Moreno-Vozmediano "Multi-cloud Deployment of Computing Clusters for Loosely-coupled MTC Applications." Jul. 2010, 17 pages; <http://datasys.cs.lit.edu/events/TPDS_MTC/papers/TPDSSI-2009-12-0637.pdf >.

V.V. Kumar, "Deployment of Multicloud for Solving Loosely Coupled Applications Using Cost Optimizing Technique," Feb. 10, 2012, 7 pages; http://www.jcaksrce.org/upload/52346359_vol5ie125p13.pdf.

Yoo et al., "Phoenix Rebirth: Scalable MapReduce on a Large-Scale Shared-Memory System", In Proceedings of the 2009 IEEE International Symposium on Workload Characterization (IISWC), Oct. 2009, pp. 198-207.

Shinnar et al., "M3R: Increased Performance for In-Memory Hadoop Jobs", Proceedings of the VLDB, 2012, vol. 5, No. 12, pp. 1736-1747.

Redhat Enterprise Linux 6, Resource Management Guide, 69 pages.

Kumar et al., "Hone: "Scaling Down" Hadoop on Shared-Memory Systems", Proceedings of the VLDB Endowment, vol. 6, No. 12, 2013, pp. 1354-1357.

Hadoop Accelerator from GridGain, 5 pages.

* cited by examiner

VIRTUAL NODE DEPLOYMENTS OF CLUSTER-BASED APPLICATIONS MODIFIED TO EXCHANGE REFERENCE TO FILE SYSTEMS

BACKGROUND

In-memory and multicore computing is becoming more prevalent in today's information technology (IT) industry. Customers can be offered with more powerful computers equipped with larger amount of memory to provide IT applications (e.g., real-time data analytics). Immediate performance gains can be achieved by deploying cluster-based applications (i.e., distributed applications) to a single machine environment that includes one OS image, a large number of processor cores, and a large amount of memory. Typically, the cluster-based application is migrated or rewritten to be compatible with the single machine environment, which involves, for example, source code changes, deployment scripts, etc.

BRIEF DESCRIPTION OF THE DRAWINGS

The following detailed description references the drawings, wherein.

DETAILED DESCRIPTION

As discussed above, cluster-based applications can be migrated to single machine environments. For example, a cluster-based application can be completely re-designed to take advantage of shared-memory and inter-thread communication (ITC) in a single machine environment. In another example, the cluster-based application can be installed on a typical machine cluster and modified to support virtual shared memory that exists across the machines in the cluster.

Single machine environments provide operating system-level virtualization and/or other lower-level containers that allow for multiple execution environments to simultaneously exist in the single machine environment. For example, a container may be a light-weight virtualized environment managed by a single OS image, which better supports resource allocation and resource isolation. In this example, control groups supported by the OS may allocate resources such as CPU, system memory, block IO devices and network bandwidth to user processes based on sharing policies.

In examples described herein, a virtual node solution using OS containers is provided, where each formerly distributed machine node is implemented as a virtual node. Container features are used to manage allocation of in-memory file systems, which are localized to optimize memory access for each node. Further, per-container IP address assignments are used in the virtual nodes to provide fast inter-process communication (IPC) between virtual nodes using the same interface the cluster-based application used in its original distributed environment. The virtual node deployment provides a general solution for the deployment of cluster-based applications in single machine environments such as a large multicore big-memory system.

In some examples, virtual nodes are created and are each assigned a core subset of a number of processing cores, an Internet protocol (IP) address, and an in-memory file system configured to provide access to a portion of physically shared memory, where the physically shared memory is accessible to each of the plurality of virtual nodes. At this stage, a cluster-based application that is configured to be deployed to a plurality of machine nodes is deployed to the plurality of virtual nodes. On a first virtual node, a reference to a first dataset stored in the physically shared memory is sent to a second virtual node. Next, on the second virtual node, the first dataset is accessed through the in-memory file system of the first virtual node.

Figure 1:
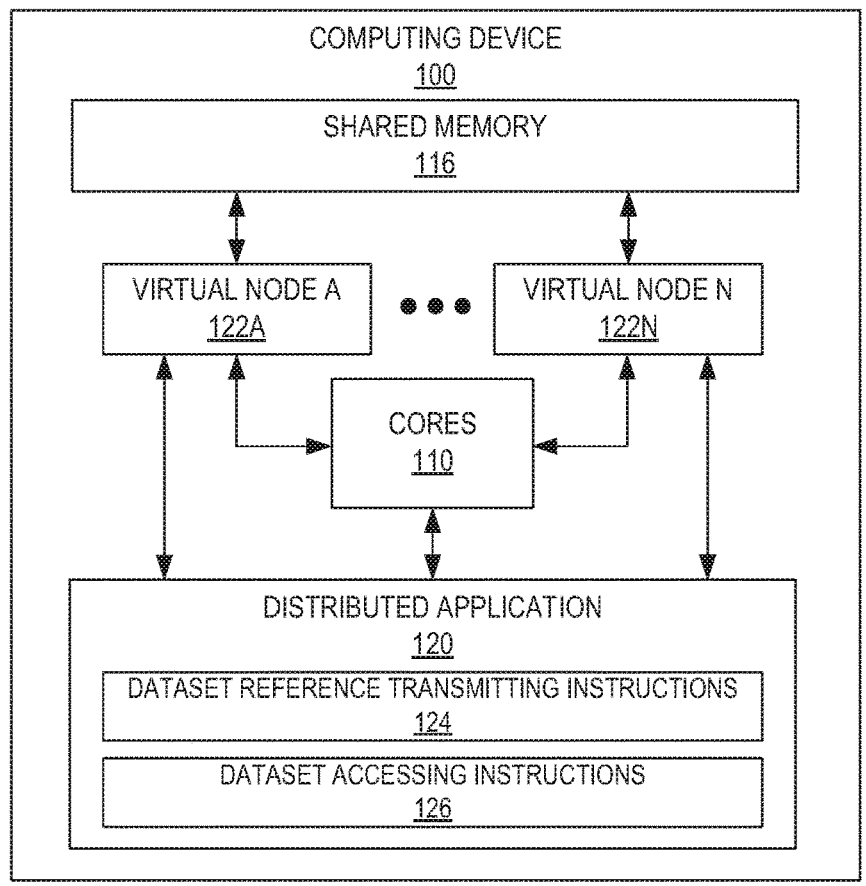
FIG. 1 is a block diagram of an example computing device for providing a cluster-based application on virtual nodes in a single machine environment.

Referring now to the drawings, FIG. 1 is a block diagram of an example computing device 100 for providing a cluster-based application on virtual nodes in a single machine environment. The computing device 100 provides a single machine environment and may be implemented as, for example, a large multicore big-memory system. In the example of FIG. 1, computing device 100 includes cores 110, shared memory 116, distributed application 120, and virtual nodes 122A, 122N.

Cores 110 may be any number of central processing units (CPUs), microprocessors, processing cores, and/or other hardware devices suitable for retrieval and execution of instructions stored in a machine-readable storage medium. Cores 110 may fetch, decode, and execute instructions 124, 126 to enable the distributed application 120 to be executed on virtual nodes 122A, 122N, as described below. As an alternative or in addition to retrieving and executing instructions, cores 110 may include any number of electronic circuits including a number of electronic components for performing the functionality of instructions 124 and/or 126.

Shared memory 116 is physically shared memory that is accessible to virtual nodes 122A, 122N. Shared memory 116 may be random access memory (RAM) that provides, for example, non-uniform memory access. Shared memory 116 may be encoded with executable instructions from distributed application 120.

Distributed application 120 is a cluster-based application that is configured to be installed on a cluster of machine nodes. Examples of distributed applications 120 include HADOOP®, High Performance Computing Cluster, etc. HADOOP® is a framework for storing and processing large-scale datasets (e.g., file-based data records, database records, etc.) on a cluster. HADOOP® is a registered trademark of Apache Software Foundation, which is headquartered in Forest Hill, Md.

Virtual nodes 122A, 122N are virtualized servers that are provided by operating system containers. For example, each virtual node (e.g., virtual node A 122A, virtual node N 122N) may be a light-weight virtualized environment managed by a LINUX® OS instance that supports resource allocation and resource isolation. Specifically, each virtual node (e.g., virtual node A 122A, virtual node N 122N) can be assigned a subset of cores 110, an internet protocol (IP) address, and an in-memory file system for accessing a portion of shared memory 116. The resources can be assigned when the virtual nodes 122A, 122N are initially configured to provide distributed application 120. LINUX® is a registered trademark of Linus Torvalds, an individual living in Portland, Oreg.

During the execution of distributed application 120, virtual nodes 122A, 122N may transmit dataset references to each other to allow multiple virtual nodes 122A, 122N to access a common dataset in shared memory 116. Dataset reference transmitting instructions 124 transmit a dataset reference from, for example, virtual node A 122A to virtual node N 122N. The dataset reference may include a location to access the common dataset stored in shared memory. For example, the dataset reference may include a file path for accessing the common dataset and an identifier for an in-memory file system that has access to a portion of the shared memory where the common dataset is stored.

Dataset accessing instructions 126 may be executed by virtual node N 122N to access the common dataset. The dataset reference received from virtual node A 122A may be used to identify the in-memory file system, which is then used to access the common dataset. The in-memory file system may be assigned to virtual node A 122A to minimize memory access time of datasets that are frequently accessed by virtual node A 122A.

Figure 2:
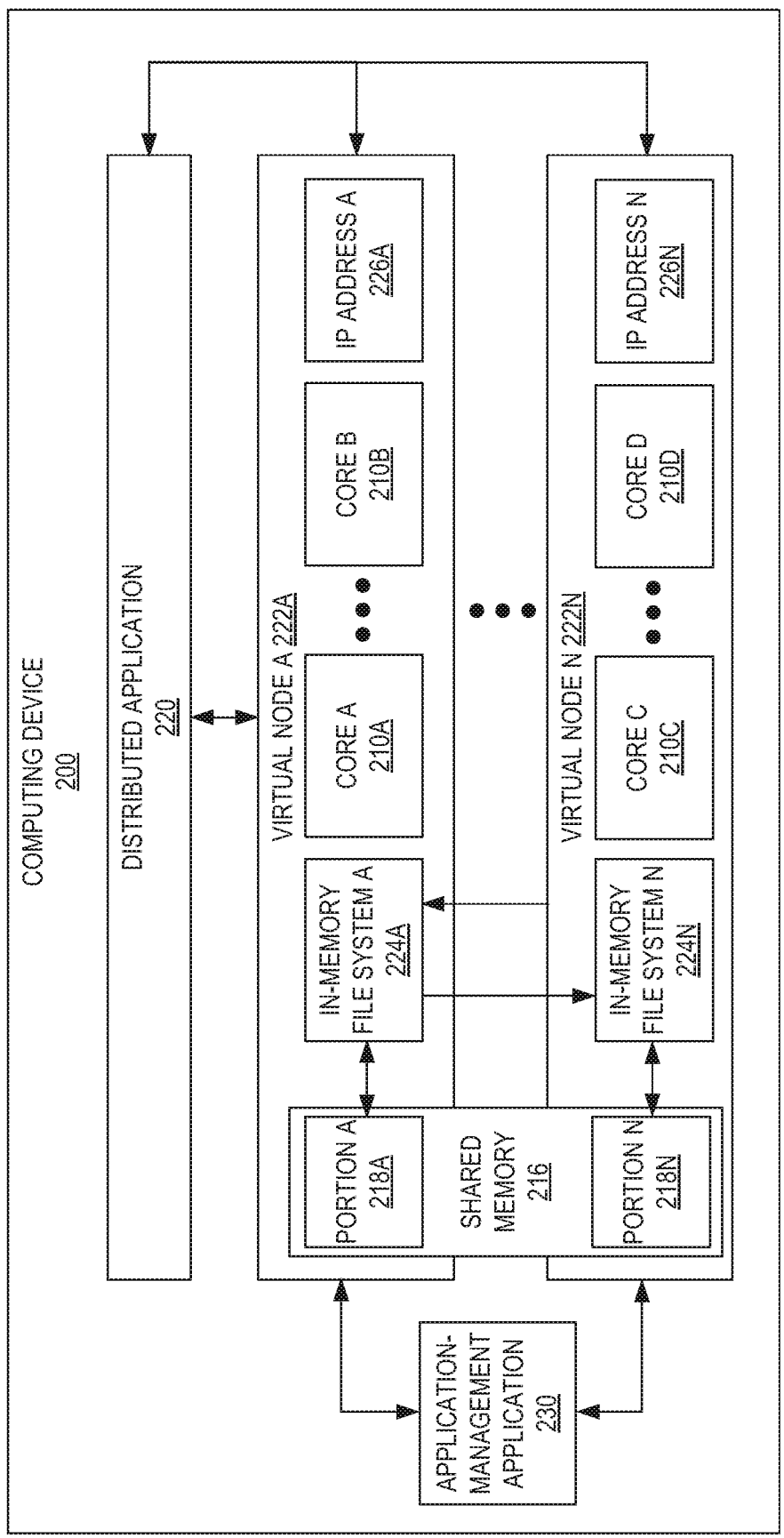
FIG. 2 is a block diagram of an example computing device that includes an application-management application for providing virtual node deployments of cluster-based applications.

FIG. 2 is a block diagram of an example computing device 200 including shared memory 216, distributed application 220, virtual nodes 222A, 222N, and application-management application 230. The components of computing device 200 may be similar to the corresponding components of computing device 100 described with respect to FIG. 1.

Application-management application 230 configures the virtual nodes 222A, 222N of computing device 200. Specifically, application-management application 230 creates virtual nodes 222A, 222N and assigns resources of computing device 200 to each virtual node. In this example, virtual node A 222A has been assigned cores 210A, 210B, IP address A 226A, and in-memory file system A 224A, which provides virtual node A 222A with access to portion A 218A of shared memory 216. Similarly, virtual node N 222N has been assigned cores 210C, 210D, IP address N 226N, and in-memory file system N 224N, which provides virtual node N 222N with access to portion N 218N of shared memory 216. Each virtual node 222A, 222N has access to the in-memory file systems 224A, 224N of the other virtual node. The access to the in-memory file systems 224A, 224N may be provided by application-management application 230, which acts as the primary operating system of computing device 200 and manages execution environments for the virtual nodes 222A, 222N. Further, each virtual node 222A. 222N can be assigned any number of process nodes (not shown) of distributed application 220, where each process node provides a service (e.g., HADOOP® distributed file system (HDFS™) or MapReduce in the case of HADOOP®, etc.) of distributed application. In FIG. 2, two virtual nodes 222A, 222N are shown, but computing device 200 can include any number of virtual nodes. HDFS™ is a registered trademark of Apache Software Foundation, which is headquartered in Forest Hill, Md.

Shared memory 216 may be non-uniform memory where memory access time is dependent on a location in the shared memory 216 relative to the accessing core (e.g., core A 210A, core B 210B, core C 210C, core D 210D). In this case, each portion (e.g., portion A 218A, portion N 218N, etc.) of shared memory 216 is assigned to a virtual node (e.g., virtual node A 222A, virtual node N 222N) such that memory access times are minimized. Further, the use of multiple in-memory file systems 224A, 224N reduces locking contention when, for example, attempting to update the metadata of data within shared memory 216 if multiple readers and writers are launched from multiple virtual nodes simultaneously (e.g., virtual node A 222A, virtual node N 222N).

For example, a Linux OS command can be used to create temporary file storage facilities ("tmpfs") as in-memory file systems 224A, 224N with the command option of "-o mpol=bind:<processor id>" to explicitly bind the in-memory file system 224A, 224N to a processor.

IP addresses 226A, 226N allows virtual nodes 222A, 222N to communicate with each other via typical TCP/IP-based channels used by distributed application 220. In other cases, other types of addresses may be used such as addresses that are compliant with a corresponding inter-process communication protocol. In a typical cluster environment, a process node may be bound to the machine node's IP address. In a single machine environment like computing device 200, multiple IP addresses 226A, 226N are created such that one IP address can be assigned to each virtual node (e.g., virtual node A 222A, virtual node N 222N). A process node bound to the virtual node (e.g., virtual node A 222A, virtual node N 222N) can then use the assigned IP address for data communication. For example, IP address aliasing can be used to create multiple IP addresses 226A, 226N on computing device 200. In some cases, multiple IP addresses 226A, 226N are created from a physical network card. In other cases, when a machine has multiple physical network cards, different IP address groups can be created and bound to a different network card, where a virtual node (e.g., virtual node A 222A, virtual node N 222N) is assigned an IP address 226A, 226N from the IP address groups.

Cores 210A-210D are cores of multi-core processors configured for single machine environments. Computing device 200 includes multiple processors (i.e., sockets), and each processor has multiple processing cores. Any number of cores may be assigned to each of the virtual nodes 222A, 222N. For example, a virtual node (e.g., virtual node A 222A, virtual node N 222N) can be assigned with all of the cores (e.g., core A 210A-core B 210B, core C 210C-core D 210D) that belong to a particular socket. Alternatively, a virtual node (e.g., virtual node A 222A, virtual node N 222N) can be assigned with only a portion of the cores (e.g., core A 210A, core C 210C) that belong to the particular socket. Application-management application 230 may be configured to ensure that a virtual node (e.g., virtual node A 222A, virtual node N 222N) is restricted to the cores allocated to the virtual node. In the case of a Linux OS, a "numactl -membind <socket id> -physcpubind <the cpu cores>" command can be used to confine a virtual node (e.g., virtual node A 222A, virtual node N 222N) to run on the specified cores. The "-membind" option specifies that all process nodes executing on the virtual node (e.g., virtual node A 222A, virtual node N 222N) should access a portion (e.g., portion A 218A, portion N 218N, etc.) of shared memory 216 bound to the specified processor. Similarly, the option of "-physcpubind" specifies the cores (e.g., core A 210A, core B 210B, core C 210C, core D 210D) that are bound to the virtual node (e.g., virtual node A 222A, virtual node N 222N).

Application-management application 230 is configured to deploy distributed application 220 to virtual nodes 222A, 222N. Distributed application 220 is a cluster-based application that is configured to be installed on a cluster of machine nodes and, for example, provide a framework for storing and processing large-scale datasets. In this case, a machine node is a physical machine with a distinct operating environment and hardware (e.g., a server, a desktop computer, etc.). In FIG. 2, distributed application 220 may be adapted to be deployed on virtual nodes 222A, 222N rather than physical machine nodes. For example, because virtual nodes 222A, 222N have physically shared memory, distributed application 220 may be adapted to pass large data sets between virtual nodes 222A, 222N using references rather than actually transferring the large data sets. In this example, performance of the distributed application is improved by reducing the latency of inter-node communications. In the case that distributed application 220 is HADOOP®, user-defined applications created using, for example, MapReduce can be deployed in the HADOOP® environment provided by distributed application 220 without modification.

Distributed application 220 executes on the virtual nodes 222A, 222N to provide access to large-scale datasets. For example, a virtual node A 222A may initiate a process for creating or modifying a dataset (e.g., file-based data records, database records, etc.), which is performed in a portion A 218A of shared memory 216. In this example, the process launched from virtual node A 222A may be performed on a subset of cores (e.g., core A 210A, core B 210B) of virtual node A 222A and may use in-memory file system A 224 to access portion A 218A. Virtual node A 222A may be configured to provide other virtual nodes (e.g., virtual node N 222N) on computing device 200 with access to the dataset by sending the other virtual nodes a reference to the dataset. The reference may identify in-memory file system A 224A and include a location (e.g., memory address, file path, etc.) of the dataset in portion A 218A, where the other virtual nodes (e.g., virtual node N 222N) can use the reference to access the dataset directly in shared memory 216 without transmitting a portion of or the entire dataset.

Figure 3:
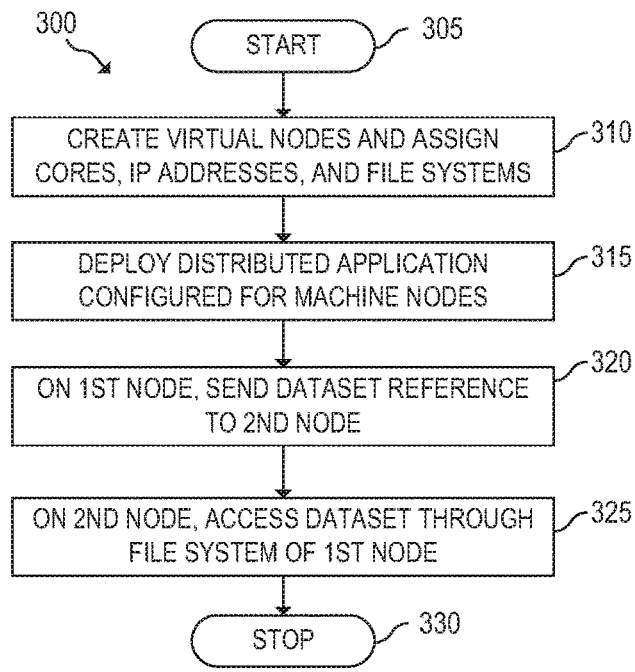
FIG. 3 is a flowchart of an example method for execution by a computing device for providing virtual node deployments of cluster-based applications.

FIG. 3 is a flowchart of an example method 300 for execution by a computing device 100 for providing virtual node deployments of cluster-based applications. Although execution of method 300 is described below with reference to computing device 100 of FIG. 1, other suitable devices for execution of method 300 may be used, such as computing device 200 of FIG. 2. Method 300 may be implemented in the form of executable instructions stored on a machine-readable storage medium and/or in the form of electronic circuitry.

Method 300 may start in block 305 and continue to block 310, where computing device 100 creates virtual nodes and assigns resources to the virtual nodes. Specifically, each virtual node may be assigned cores, an IP address, and in-memory file system. In block 315, a distributed application that is configured for a cluster of machine nodes is deployed to the virtual nodes. In some cases, the distributed application is modified to optimize performance for a single machine environment before it is deployed to the virtual nodes.

In block 320, a first virtual node of computing device 100 sends a dataset reference to a second virtual node. The dataset reference may include a location in shared memory of the common dataset to be shared. In block 325, a second virtual node of computing device accesses the common dataset through an in-memory file system that is assigned to the first virtual node. Method 300 may then proceed to block 330, where method 300 ends.

Figure 4:
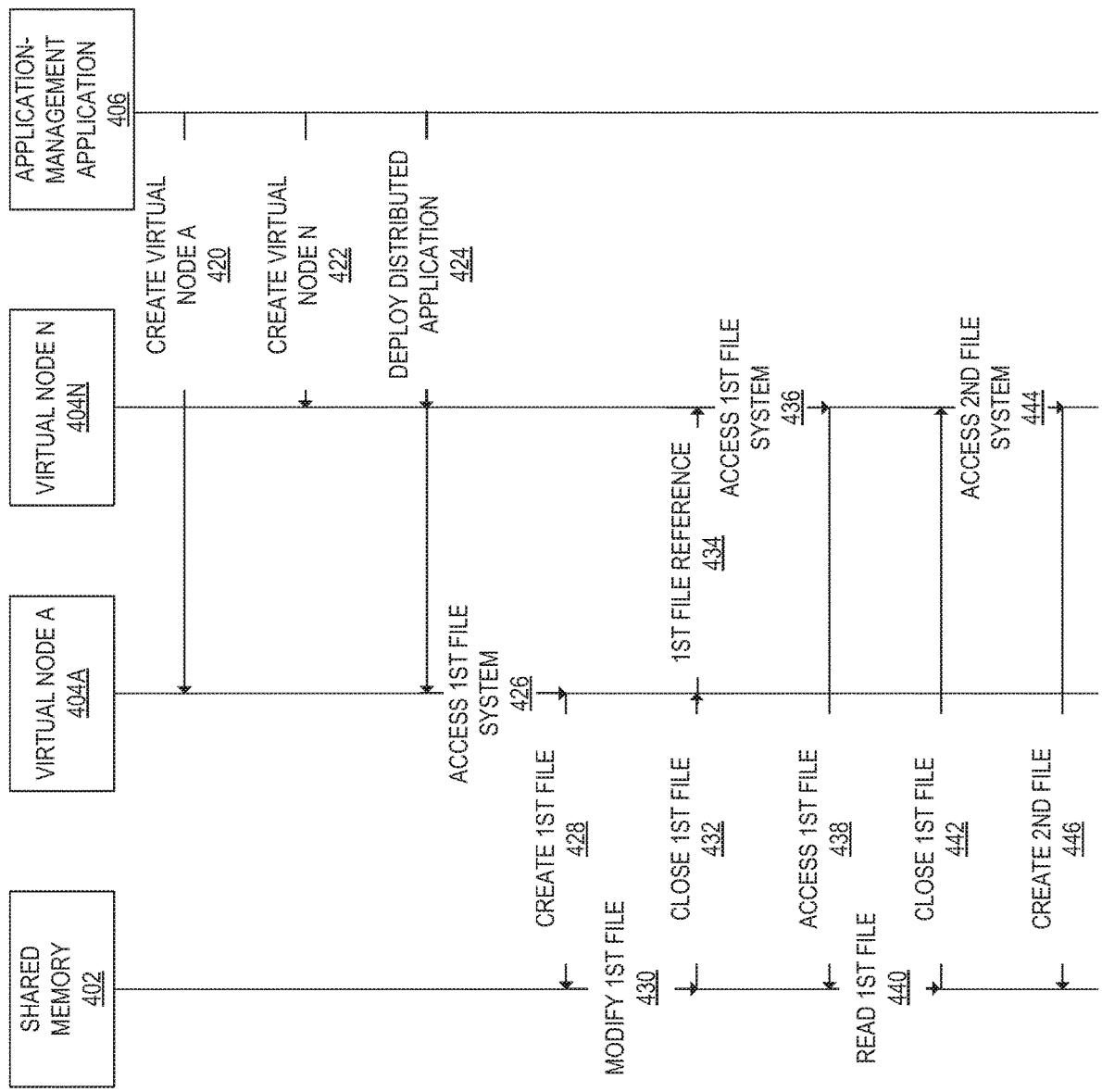
FIG. 4 is a workflow diagram showing an example virtual node deployment that is configured to provide a cluster-based application.

FIG. 4 is a workflow diagram 400 showing an example virtual node deployment that is configured to provide a cluster-based application. Workflow diagram 400 shows shared memory 402, virtual node A 404A, virtual node N 404N, and application-management application 406, which may each be similar to their corresponding components described above with respect to FIGS. 1 and 2.

In block 420, application-management application 406 creates virtual node A 404A and then assigns resources (e.g., IP address, processing cores, in-memory file system, etc.) to virtual node A 404A. In block 422, application-management application 406 creates virtual node N 404N and then assigns resources (e.g., IP address, processing cores, in-memory file system, etc.) to virtual node N 404N.

In block 424, application-management application 406 deploys a distributed application to virtual node A 404A and virtual node N 404N. The distributed application was originally configured to be installed on a cluster of machine nodes, and in this example, each of the virtual nodes 404A, 404N acts as a machine node so that the distributed application can be installed in a single machine environment such as computing device 200 of FIG. 2.

In block 426, virtual node A 404A accesses a first in-memory file system that manages data in a first portion of shared memory 402. The first in-memory file system may be mounted and shared to the virtual nodes 404A, 404N by application-management application 406 when resources were assigned in block 420. In block 428, virtual node A 404A uses the first in-memory files system to create a first file in shared memory 402. Virtual node A 404A may then proceed to modify and close the first file in shared memory 404 in blocks 430 and 432.

In block 434, virtual node A 404A sends a first file reference to virtual node N 404N. In block 436, virtual node N 404N accesses the first in-memory file system that manages data in the first portion of shared memory 402. In block 438, virtual node N 404N uses the first in-memory files system to access the first file in shared memory 402. Virtual node N 404N may then proceed to read and close the first file in shared memory 404 in blocks 440 and 442.

In block 444, virtual node N 404N accesses a second in-memory file system that manages data in a second portion of shared memory 402. Similar to the first in-memory file system, the second in-memory file system may be mounted and shared to the virtual nodes 404A, 404N by application-management application 406 when resources were assigned in block 422. In block 446, virtual node N 404N uses the second in-memory files system to create a second file in shared memory 402.

The foregoing disclosure describes a number of examples for deploying cluster-based applications using virtual nodes. In this manner, the examples disclosed herein facilitate deploying a distributed application to a single machine environment by using virtual nodes that are assigned resources to simulate a cluster of machine nodes.

We claim:

1. A system for deploying cluster-based applications using virtual nodes, comprising:
   a processor and memory storing instructions for an application-management application and a distributed application;
   a plurality of operating system containers that each provides an isolated environment for each one of a plurality of virtual nodes, each of the plurality of virtual nodes existing simultaneously in a single machine environment;
   physically shared memory divided into a plurality of non-overlapping portions, each portion associated with a respective in-memory file system configured to provide access to its respective portion of physically shared memory;
   wherein the application-management application is executed by the processor to:
      create the plurality of virtual nodes by allocating to each virtual node, a subset of processing cores of a plurality of processing cores, a portion of the plurality of portions of physically shared memory, and the in-memory file system associated with the allocated portion of physically shared memory, wherein each portion of the physically shared memory is only allocated to a single virtual node; and modify the distributed application initially configured to transmit datasets between physical machine nodes to instead transmit references to datasets between virtual nodes; and deploy the distributed application to the plurality of virtual nodes; and wherein the distributed application is executed by the processor to:

direct a first virtual node of the plurality of virtual nodes to send a reference to a first dataset stored in a first portion of the physically shared memory allocated to the first virtual node to a second virtual node of the plurality of virtual nodes;

direct the second virtual node to access the first dataset through the in-memory file system of the first virtual node using the reference, and use the in-memory file system of the second virtual node to create a second dataset in a second portion of the physically shared memory, separate from the first portion, allocated to the second virtual node.

2. The system of claim 1, wherein the physically shared memory is a non-uniform memory and each virtual node is assigned a portion of the non-uniform memory, and wherein the subset of processing cores is assigned to the first virtual node to minimize a memory access time that is based on a relative location of the subset of the processing cores of the first virtual node with respect to the portion of the non-uniform memory assigned to the first virtual node.

3. The system of claim 2, wherein the distributed application is further executed to:

direct the second virtual node to receive a request to create a second dataset in the physically shared memory; and direct the second virtual node to use the in-memory file system of the second virtual node to create the second dataset in the portion of the non-uniform memory assigned to the second virtual node.

4. The system of claim 1, wherein each virtual node of the plurality of virtual nodes has access to the in-memory file system of each of the other virtual nodes of the plurality of virtual nodes.

5. The system of claim 1, wherein the reference to the first dataset identifies the in-memory file system of the first virtual node.

6. A method for deploying cluster-based applications using virtual nodes, comprising:

creating a plurality of virtual nodes that are each assigned a subset of processing cores of a plurality of processing cores, an Internet protocol (IP) address of a plurality of IP addresses, and an in-memory file system of a plurality of in-memory file systems configured to provide access to a physically shared memory divided into a plurality of non-overlapping portions, each portion associated with a respective in-memory file system configured to provide access to its respective portion of physically shared memory, each of the plurality of virtual nodes existing simultaneously in a single machine environment;

deploying a distributed application configured for deploying to a plurality of machine nodes, the distributed application being modified from transmitting datasets between two or more of the plurality of machine nodes to instead transmitting references to datasets between virtual nodes;

using a first virtual node of the plurality of virtual nodes to send a reference to a first dataset stored in a first portion of the physically shared memory allocated to the first virtual node to a second virtual node of the plurality of virtual nodes;

using the second virtual node to access the first dataset through the in-memory file system of the first virtual node using the reference obtained from the first virtual node; and using the in-memory file system of the second virtual node to create a second dataset in a second portion of the physically shared memory allocated to the second virtual node, the second portion being separate from the first portion.

7. The method of claim 6, wherein the physically shared memory is non-uniform memory, and each virtual node is assigned a portion of the non-uniform memory, and wherein the subset of processing cores is assigned to the first virtual node to minimize a memory access time that is based on a relative location of the subset of the processing cores of the first virtual node with respect to the portion of the non-uniform memory assigned to the first virtual node.

8. The method of claim 6, wherein each virtual node of the plurality of virtual nodes has access to the in-memory file system of each of the other virtual nodes of the plurality of virtual nodes.

9. The method of claim 6, wherein the reference to the first dataset identifies the in-memory file system of the first virtual node.

10. A non-transitory machine-readable storage medium encoded with instructions executable by a processor for deploying cluster-based applications using virtual nodes, the instructions to:

create a plurality of virtual nodes that are each assigned a subset of processing cores of a plurality of processing cores, and one of a plurality of in-memory file systems providing access to a physically shared memory divided into a plurality of non-overlapping portions, each portion associated with a respective in-memory file system configured to provide access to its respective portion of physically shared memory, each of the plurality of virtual nodes existing simultaneously in a single machine environment;

deploy a distributed application the distributed application being modified from transmitting datasets between two or more of the plurality of machine nodes to instead transmitting references to datasets between virtual nodes, wherein the instructions further causing the processor to:

direct a first virtual node of the plurality of virtual nodes to send a reference to a first dataset stored in the physically shared memory to a second virtual node of the plurality of virtual nodes;

direct the second virtual node to access the first dataset through the in-memory file system of the first virtual node using the reference; and use the in-memory file system of the second virtual node to create a second dataset in the portion, separate from the first portion, of the physically shared memory assigned to the second virtual node, the second portion being separate from the first portion.

11. The non-transitory machine-readable storage medium of claim 10, wherein the physically shared memory is non-uniform memory and each virtual node is assigned a portion of the non-uniform memory, and wherein the subset of processing cores is assigned to the first virtual node to minimize a memory access time that is based on a relative location of the subset of the processing cores of the first virtual node with respect to the portion of the non-uniform memory assigned to the first virtual node.

12. The non-transitory machine-readable storage medium of claim 10, wherein the reference to the first dataset identifies the in-memory file system of the first virtual node.

* * * * *